United States Patent [19]
Mohrenstein-Ertel et al.

[11] 3,855,906
[45] Dec. 24, 1974

[54] CONTACT FREE AND DIRECTLY COOLED PISTON ARRANGEMENT

[76] Inventors: Alexander Mohrenstein-Ertel; Michael Mohrenstein-Ertel, both of Hegelstrasse 81, 8600 Bamberg, Germany

[22] Filed: Mar. 15, 1974

[21] Appl. No.: 452,010

Related U.S. Application Data
[63] Continuation of Ser. No. 240,574, April 3, 1972, abandoned.

[30] Foreign Application Priority Data
Apr. 5, 1971 Germany............................ 2116624

[52] U.S. Cl......................... 92/153, 92/167, 92/168, 308/4
[51] Int. Cl......................... F01b 31/10, F16j 15/18
[58] Field of Search ............. 92/167, 166, 168, 153, 92/83, 108; 123/193 P, 193 CP

[56] References Cited
UNITED STATES PATENTS

| | | | |
|---|---|---|---|
| 982,394 | 1/1911 | Stickney................................ | 92/167 |
| 1,734,795 | 11/1929 | Claxton................................. | 92/108 |
| 2,241,541 | 5/1941 | Crangle................................. | 92/83 |
| 2,468,509 | 4/1949 | Naah..................................... | 92/167 |
| 3,424,065 | 1/1969 | Kurt et al.............................. | 92/167 |
| 3,548,721 | 12/1970 | Eisennegger.......................... | 92/153 |
| 3,633,459 | 1/1972 | Wilfried................................. | 92/108 |

FOREIGN PATENTS OR APPLICATIONS
771,334   3/1957   Great Britain ........................ 92/108

*Primary Examiner*—Paul E. Maslousky
*Attorney, Agent, or Firm*—Kirkland & Ellis

[57] ABSTRACT

A mushroomed type piston is mounted on the top of a reciprocating hollow cylindrical piston bushing. The piston has a flanged side wall extending downwardly adjacent to and parallel to the piston cylinder wall so that an annular space is formed between the piston side wall and the piston bushing. A supporting wall extends upwardly into the annular space and sliding bearing pieces are mounted on the supporting wall and slidably provide frictionless support for the piston bushing. Provided on the exterior of the flanged side wall of the piston is a contact-free labyrinth packing or seal which serves the dual function of sealing and cooling the piston. Inlet and outlet ports are provided through the piston side wall to admit carburant and cooling air, and to exhaust combustants.

7 Claims, 3 Drawing Figures

CONTACT FREE AND DIRECTLY COOLED PISTON ARRANGEMENT

This is a continuation, of application Ser. No. 240,574 now abandoned, filed Apr. 3, 1972.

The greatest drawbacks and failure sources in conventional pistons of internal combustion engines are the friction between piston (sealing) and cylinder wall, and the fact that fuel and combustion products affect this critical sliding surface. These were the reasons why the number of revolutions of the engine, in particular of those having larger dimensioned cylinders (pistons) was rather limited, and why, moreover, exclusively liquid (gaseous) fuels having no solid residual matter lent themselves for all types of internal combustion engines. Progress in the development of modern type light and solid metal alloys and advance in bearing techniques now permit to let even larger dimensioned internal combustion engines run at a speed making the sealing by piston rings superfluous and instead allowing the use of a contact-free labyrinth packing. As a result, it is the object of the invention to provide the construction of the piston and of its bearing as explained hereinafter.

Figure 1:
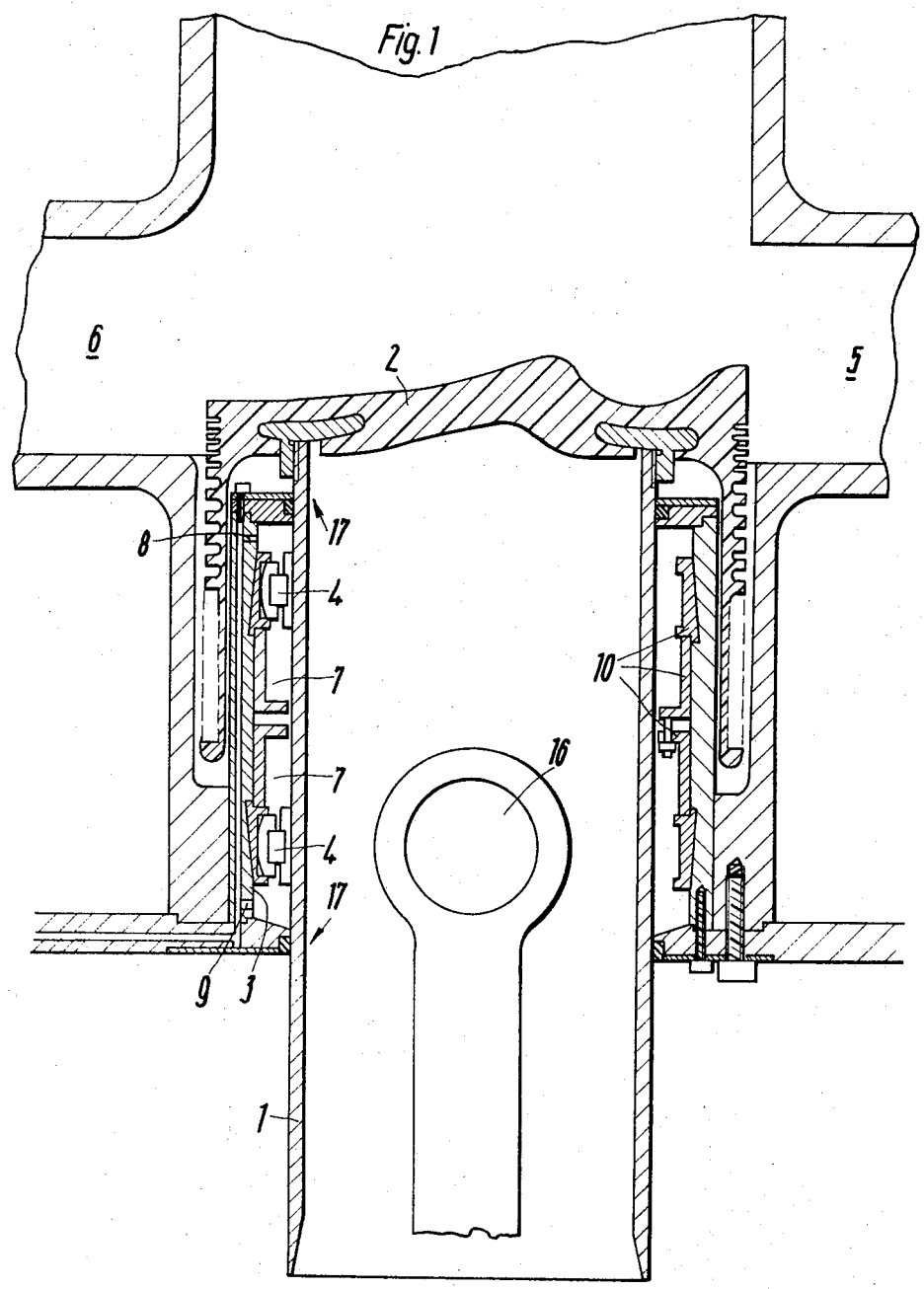
FIG. 1 shows a mushroom-type piston cooperating with a bearing arrangment.
Figure 2:
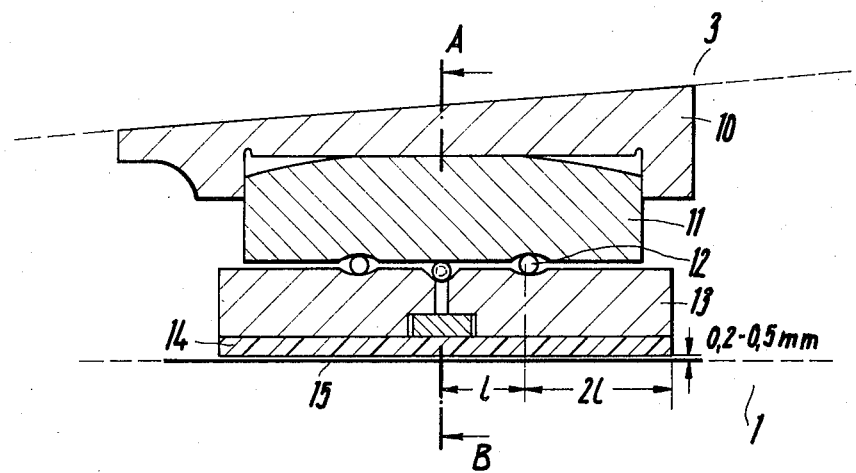
FIGS. 2 and 2a are enlarged sectional views of a part of the bearing arrangement.
Figure 2A:
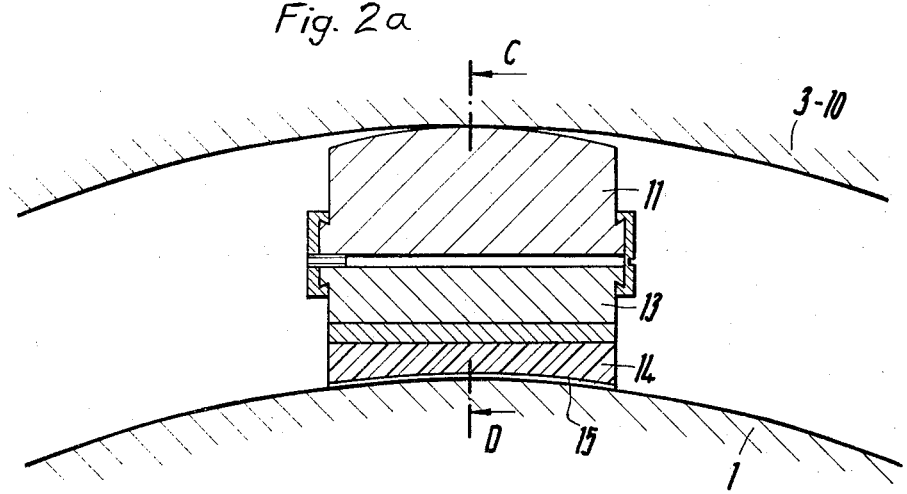

A mushroom-type piston 2 is attached to a piston bushing 1. In FIG. 1 it is shown screwed on the piston bushing. Between the piston bushing 1 and the mushroom-type piston 2 a supporting wall 3 is located to which the plain bearings 4 are secured. These consist of six gliding pieces uniformly distributed on the circumference. One such gliding piece is shown in FIG. 2.

By this construction combustion chamber and sliding surface have been separated from each other.

Details of the construction and function (a two-stroke system having been elected as embodiment example) are as follows:

a. The mushroom-type piston 2 shall consist of a light weight, solid, fairly heat-conductive metal (e.g., silver). The grooves in the piston shall be in close arrangement in the upper part thereof, one after the other, and serve as sealing, while they shall be wider and deeper in the lower part and have the function of cooling fins. The piston shall be long enough so that the bottom edge of mushroomed-type piston 2 will not move above the bottom of the inlet 5 and the outlet 6 in its upward stroke (compression). Thereby it is ensured that the piston is steadily cooled by the air blown in at 5 and exiting at 6.

By such direct cooling of the piston better effectiveness is achieved in an internal combustion engine, which may be further enhanced by a possible mirror-coating of the cylinder walls and the piston.

From the fact that thereby the piston does no longer contact the wall of the combustion chamber proper, the interesting potentiality results to use solid matter as carburant (such as e.g., coal dust).

b. The mounting of the piston bushing 1 is made by two rows of six hydrodynamic sliding pieces each, uniformly distributed on the circumference. Each of the rows is associated with a conical ring 10 on which the sliding pieces are supported, as represented in FIG. 2. Each sliding piece consists of an outer steel piece 11 and an inner steel piece 13. the conical ring 10 is slotted at one spot between the sliding pieces and is in point-contact with the outer steel piece 11 in the center thereof. Each outer steel piece 11 presses on the inner steel piece 13 through rolls 12, thereby jointly causing a distribution of the elastic pressure in a manner of an isosceles triangle onto an elastic plastic layer 14, with the maximum of the pressure in the center of the sliding piece. Underneath said elastic layer 14 a thin sheet 15 of white metal is disposed which is glued onto said layer. Upon the stroke of the piston bushing 1 an optimally thick hydrodynamic oil film forms between the piston bushing and said white metal layer, said film diminishing the friction to a value corresponding to a friction coefficient of 0.001. The friction thus is no minor that the two slotted conical rings 10 can be axially slidably offset by means of tensioning screws as shown in FIG. 1. Thereby the two rows of sliding pieces may be radially inwardly biased, as shown in FIG. 1. However, in this action the starter of the engine must overcome a quite considerable static friction.

For lubrication and cooling of the bearings the space 7 between the piston bushing 1 and the supporting wall 3 is provided, flown through by oil from a conventional oil pump and reservoir means admitted through inlet lines 8 and discharged through outlet lines 9.

What we claim is:

1. In a device having a cylindrical chamber having a cylindrical wall and inlet and outlet ports on opposite side of the chamber, a contact-free piston arrangement comprising:
   a supporting wall mounted within the chamber at the lower portion of the chamber to form an annular recession between said supporting wall and the cylindrical wall of the chamber;
   annular bushing means mounted on said supporting wall capable of being biased inwardly;
   a cylindrical sleeve slidably supported and guided by said bushing means for movement between a first position and a second position within the chamber;
   a piston head mounted on said sleeve, said piston head dimensioned to slide within the chamber without contacting the cylindrical wall of the chamber, said piston head having an annular cylindrical side wall essentially parallel to said sleeve and adapted to extend into the annular recession between the cylindrical wall of the chamber and said supporting wall when said sleeve is in its first position, and said piston head having annular grooves formed in said side wall to form a labyrinth seal between said piston head and the cylindrical wall of the chamber.

2. A contact-free piston arrangement, as claimed in claim 1, further comprising:
   sealing means at the bottom of the chamber abutting said sleeve to form an enclosed chamber between said sealing means and said bushing means; and
   means to circulate a lubricating and cooling agent through said enclosed chamber between said sealing means and said bushing means.

3. A contact-free piston arrangement, as claimed in claim 1, wherein said bushing means comprises axially spaced plain bearings.

4. A contact-free piston arrangement, as claimed in claim 3, wherein said plain bearings are hydrodynamic plain bearings.

5. A contact-free piston arrangement, as claimed in claim 1, wherein the annular grooves formed in the side wall of said piston head vary in width and depth so that the grooves at the upper portion of the side wall are narrower and shallower and the grooves at the lower portion of the side wall of said piston head are wider.

6. A contact-free piston arrangement, as claimed in claim 3, wherein said plain bearings are mounted on slotted conical rings, and tension screw means are provided causing said plain bearings to be radially biased by axial displacement of said rings by said tension screw means.

7. A contact-free piston arrangment, as claimed in claim 6, wherein said plain bearings comprise: a plurality of sliding members uniformly distributed about the circumference of said sleeve, said sliding members comprising:

an outer piece having a point like projection bearing on an associated ring;

an inner piece;

rollers mounted between said inner and outer pieces;

a plastic layer affixed to the inner piece; and a white metal sheet affixed to said plastic layer, said white metal sheet slidably contacting said sleeve.

* * * * *